Oct. 4, 1955  H. A. GOLLMAR  2,719,595
PROCESS AND APPARTUS FOR PRODUCTION OF HYDROGEN CYANIDE
Filed Jan. 12, 1952
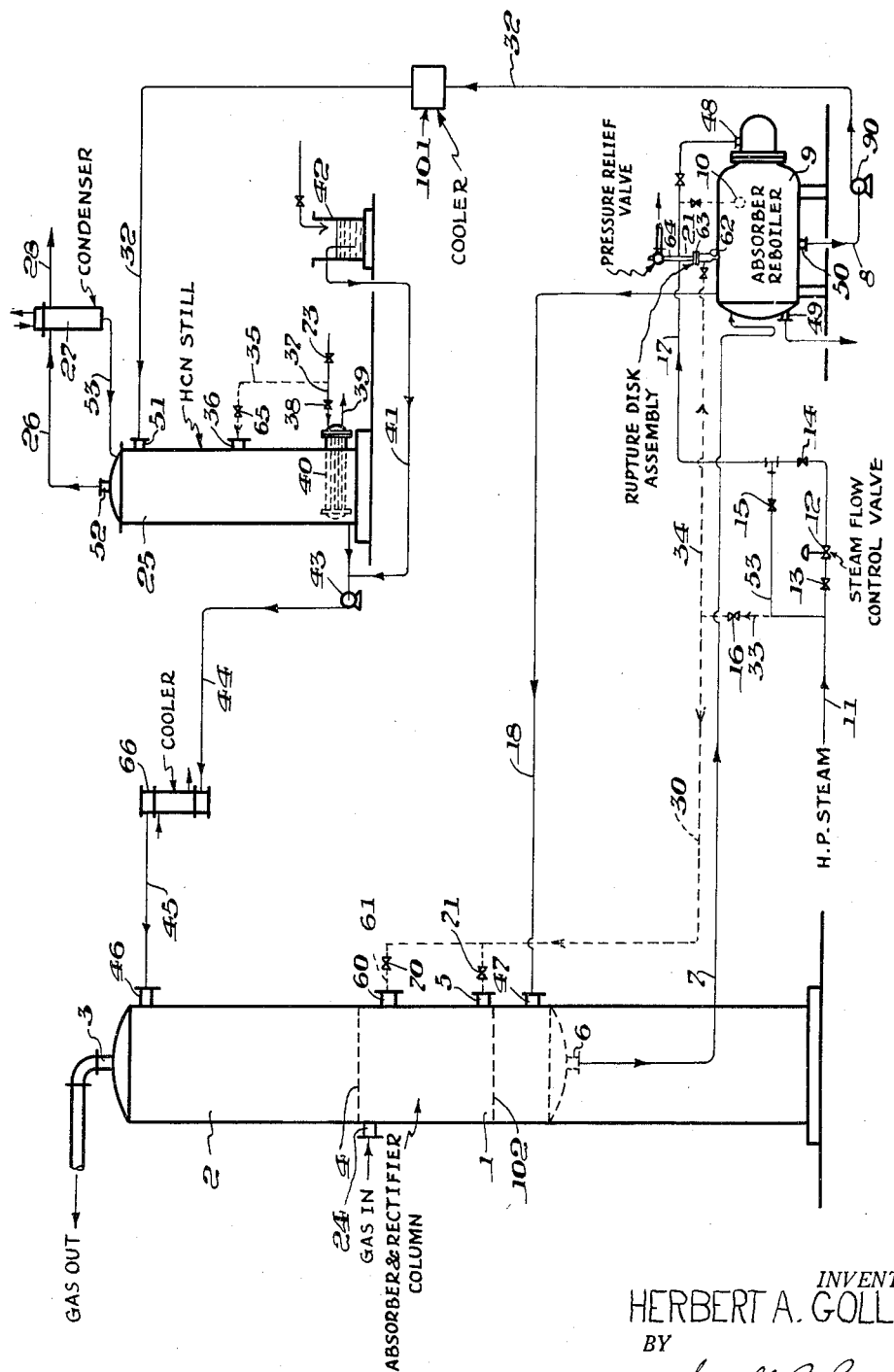
INVENTOR.
HERBERT A. GOLLMAR
BY
*Sewall P. Bronstein*
ATTORNEY.

United States Patent Office 2,719,595
Patented Oct. 4, 1955

2,719,595

PROCESS AND APPARATUS FOR PRODUCTION OF HYDROGEN CYANIDE

Herbert A. Gollmar, Pittsburgh, Pa., assignor to Koppers Company, Inc., a corporation of Delaware Application January 12, 1952, Serial No. 266,180

6 Claims. (Cl. 183—2)

This invention relates to improvements in the recovery of gaseous hydrogen cyanide from gases containing hydrogen cyanide; more specifically it relates to improvements in the recovery of gaseous hydrogen cyanide from coke oven gases containing hydrogen cyanide; still more specifically it relates to improvements in the recovery of hydrogen cyanide from actifier gases emerging from the actifier of a coke oven by-product actification unit, which actifier gases contain mixtures of hydrogen cyanide, hydrogen sulfide and other acidic gases.

In the recovery of hydrogen cyanide from coke oven gases containing hydrogen cyanide, hydrogen sulfide, carbon dioxide and other gaseous compounds, it is the practice to absorb hydrogen cyanide and other acidic gases from coke oven gas with a liquid absorbent, remove such hydrogen cyanide and acidic gases from the absorbent by passing an actifier gas or vapor countercurrent to a flow of the acidic gas-containing absorbent, recover free hydrogen cyanide from the actifier gas containing the same and other acidic gases by a countercurrent flow of plain or acidic water in an absorber and rectifier system which plain or acidic water selectively absorbs the hydrogen cyanide, and finally strip the gaseous hydrogen cyanide from the plain or acidic water in a hydrogen cyanide still. A typical system for recovering hydrogen cyanide from coke oven gas as described above is shown in U. S. Patent 2,419,225 to Mitchell dated April 22, 1947.

In the past, in utilizing such a standard method of hydrogen cyanide removal, deposits of hard black solid material form in certain zones of the absorber and rectifier system, as well as the hydrogen cyanide still system. Typical of such zones are the spaces inside charge and discharge ports, manholes, inspection holes, connections to pressure relief valves, pressure gages, instruments and pressure and temperature control units. These deposits of solid material if not removed, soon spread into the center portion of the apparatus, eventually plugging the apparatus completely. The formation of such hard solids presents obvious operational difficulties and necessitates frequent operational shut downs for their removal. Moreover, the deposits are very difficult to remove since they must be chipped off.

These points at which such solid material starts to form, have one feature in common, mainly none of them are thoroughly wetted by the flow of liquid down the column.

It is believed that such solid material is formed by polymerization of either the hydrogen cyanide or some other gaseous material originally contained in coke oven gas and which is present in the absorber, rectifier and still, since no solid material is present as such, or in solution, at any time in these units.

The present invention provides a means for preventing the formation of solid material in the above-mentioned zones.

In accordance with the present invention it has now been found that the formation of solid material in the above zones is prevented by sweeping through each of the above mentioned zones a flow of steam supplied from either the steam utilized in heating the reactification unit to rectifying temperature, or the steam utilized in heating the hydrogen cyanide still, or steam from any steam source.

It has been found that if steam is fed from a steam source by individual steam lines to each of the above zones and is allowed to sweep through these zones, that solid material will not form therein.

The present invention may be applied to any apparatus for treating and handling gaseous hydrogen cyanide in which there are zones in which solid material tends to form and accumulate, as well as to a system for recovering hydrogen cyanide from coke oven gas containing hydrogen cyanide. It is especially adapted to be applied to a system for recovery of hydrogen cyanide from actifier gas emerging from a coke oven by-product actification unit containing hydrogen cyanide, hydrogen sulfide and carbon dioxide, which system has a hydrogen cyanide absorber, rectifier, and still, including such a system in which a reboiler with steam coils or tubes is utilized outside as well as inside of the rectifier column. In the latter case, where the reboiler is located outside of the rectifier column, solid deposits may be prevented from buiding up in zones in the reboiler such as the inside sections of manholes, pressure relief valve connections, etc., by applying the present invention thereto.

Part of the steam used in maintaining the rectifier column at rectifying temperatures or steam from any source can be utilized as a sweeping steam for preventing solids formation in the solid-forming zones of the rectifier, reboiler and absorber. The former is the most advantageous source since there are no increased steam costs. In such a case, the sweeping steam will not only prevent solids formation but will also act as a source of heat for maintaining rectification temperatures in the rectifier.

Part of the steam used in maintaining the hydrogen cyanide still at distillation temperatures, or steam from any source can be utilized as a sweeping steam for preventing solids formation in the solids forming zones of the hydrogen cyanide still. The former is the most advantageous, since there are no increased steam costs.

The steam utilized in the present invention may be steam at atmospheric or superatmospheric pressures.

It is believed that the sweeping of these zones with steam prevents the formation of solid material by preventing polymerization.

Figure 1 discloses an embodiment of the present invention. The drawing discloses a typical absorber and rectifier 2 and 1 respectively corresponding to 82 and 84 of the drawing of U. S. Patent 2,419,225. However, reboiler 9 of Figure 1 is located outside of rectifier 1 rather than at the bottom thereof as shown by 94 in the drawing of U. S. Patent 2,419,225.

Actifier gas containing hydrogen cyanide, hydrogen sulfide, carbon dioxide and other acidic gases and coming from the actification unit 10 of the drawing of U. S. Patent 2,419,225 enters hydrogen cyanide absorber 2 of Figure 1 of the present case at inlet 24 and passes upwardly countercurrently to a flow of acidified water entering absorber 2 at inlet 46. Absorber 2 is filled with saddle packing supported on packing retaining plate 4, and rectifier 1 is filled with packing supported on packing-retaining plate 102. The acidified water selectively absorbs in the absorber hydrogen cyanide and small amounts of the other acidic gases, mainly hydrogen sulfide, from the actifier gas and thereafter flows downwardly through rectifier 1 also filled with saddle packing, being heated during its flow through the rectifier by a flow of steam entering the rectifier from line 18 and inlet 47. The acidic water is heated sufficiently in rectifier 1 to selectively drive off most of the acidic gases other than hydrogen cyanide absorbed therein which acidic gases pass upwardly into the absorber. However, the water is heated insufficiently to drive off the hydrogen cyanide. The acidic gases other than hydrogen cyanide not absorbed in the absorber and which are driven off in the rectifier pass out of the top of the absorber through line 3. The hydrogen cyanide-containing acidic water passes through outlet 6 of the rectifier and line 7 to reboiler 9, provided with tubes (not shown) through which steam is passed from inlet 48 to outlet 49. The hydrogen cyanide-containing liquor flows through the reboiler, outside the aforementioned tubes, out of outlet 50 through pump 90 and line 32 to hydrogen cyanide still 25. Some of the water of the hydrogen cyanide-containing liquor is evaporated to steam in reboiler 9, which steam passes through line 18 to inlet 47 of rectifier 1 where it acts as a source of heat to rectify the acidic water passing through rectifier 1. The hydrogen cyanide-bearing water, after leaving the reboiler and passing through line 32, and cooler 101, enters hydrogen cyanide still 25 at inlet 51 where it is heated by steam passing through line 37, valve 73 and valve 38 into the tubes of reboiler 40 and finally out of the reboiler through line 39. The amount of steam admitted through line 37 is sufficient to drive off free hydrogen cyanide through outlet 52 and line 26, from whence it passes through a condenser 27, where the bulk of the water vapor escaping with hydrogen cyanide from the top of the still is condensed and separated from the hydrogen cyanide and returned to the still through line 53. Gaseous hydrogen cyanide passes out of condenser 27 through line 28. Hydrogen cyanide-free water is pumped from the bottom of still 25 by pump 43 through cooler 66 to absorber 2 where it is used again as an absorbent for absorbing hydrogen cyanide from hydrogen cyanide-containing actifier gases.

Make-up water for the system is added at a point in line 44 before pump 43. Any make-up water, or required addition of acidifying agent to the absorbent water for the hydrogen cyanide recovery system, is first introduced into mixing tank 42 from whence it is forced by pump 43 into the liquor circuit of the process. Steam entering inlet 48 of reboiler 9 is supplied from a steam source, not shown, through line 11, valve 13, steam flow control valve 12, valve 14 and line 17. Steam flow control valve 12 may be bypassed by means of line 53 and valve 15 in which case valves 13 and 14 are closed. Reboiler 9 is supplied with a pressure relief valve 21 having a lower section 62 and an upper section 64 separated by a rupture disk assembly 63. Valve 21 prevents the buildup of excess pressure in the system.

The temperature in rectifier 1 may be controlled by having a temperature-responsive device located in the rectifier which controls the steam flow control valve 12 to control the amount of steam passing through reboiler 9 and hence the amount of steam entering rectifier 1 through line 18. The same type of device may be utilized to control the temperature in the still. Steam line 11 is tapped by line 33 to permit the flow of steam through line 31, valve 16, line 30 and valve 71 to packing charge and discharge port 5 into which it is ejected so as to sweep through the port space. Steam also passes from line 30 through line 61 and valve 70 and is ejected into packing charge port 60 so as to sweep through the port space. Steam also passes from line 33 to line 34 and is ejected into the top portion of section 62 of pressure relief valve 21 at a point below the rupture disk so as to sweep through section 62. Steam also passes from line 37 through line 35 and valve 65 and is ejected into port 36 of still 25 so as to sweep through the port space.

Although an attempt has been made to describe the theory involved in the present invention, the present invention is not limited to such theory.

It will be obvious to those skilled in the art that various modifications can be made in the several parts of the present apparatus and the several steps of the present process in addition to those enumerated herein above without departing from the spirit of the present invention, and it is intended to cover in the claims such modifications as are included in the scope thereof.

I claim:

1. In a system for separating hydrogen cyanide from a hydrogen cyanide-containing gas emerging from a coke oven by-product gas actification unit, said hydrogen cyanide recovery system comprising an absorber and rectifier system in which non-basic aqueous scrubbing solution countercurrently absorbs hydrogen cyanide from said hydrogen cyanide-containing gas, and a hydrogen cyanide still system in which said absorbed hydrogen cyanide is separated from said non-basic aqueous scrubbing solution and wherein hard solid material forms in zones in at least one of said systems, the improvement comprising means for sweeping said zones with a flow of steam and means for supplying steam to said sweeping means, thereby preventing the formation of said hard deposits of solid material.

2. In a system for separating hydrogen cyanide from a hydrogen cyanide-containing gas emerging from a coke oven by-product gas actification unit, said hydrogen cyanide recovery system comprising an absorber and rectifier system in which acidic water countercurrently absorbs hydrogen cyanide from said hydrogen cyanide-containing gas, and a hydrogen cyanide still system in which said absorbed hydrogen cyanide is separated from said acidic water, said absorber and rectifier system and said hydrogen cyanide still system having zones therein in which deposits of hard solid material form, the improvement comprising means for sweeping said zones with a flow of steam and means for supplying steam to said sweeping means, thereby preventing the formation of said hard deposits of solid material.

3. In a process for separating hydrogen cyanide from a hyrogen cyanide-containing actifier gas emerging from a coke oven by-product gas actification unit, said process comprising selectively absorbing said hydrogen cyanide from said actifier gas by a countercurrent flow of acidic water in an absorber having zones therein in which hard solid material forms, heating the hydrogen cyanide-containing acidic water to drive off acidic gases other than hydrogen cyanide contained therein in a rectifier having zones therein in which hard solid material forms and removing said hydrogen cyanide from said liquid absorbent by heating the same in a hydrogen cyanide still having zones therein in which hard solid material forms, the improvement of sweeping said zones with a flow of steam thereby preventing the formation of said hard deposits.

4. In a process for separating hydrogen cyanide from a hydrogen cyanide-containing actifier gas emerging from a coke oven by-product gas actification unit which comprises passing said gas to an absorber and rectifier system, selectively absorbing said hydrogen cyanide from said actifier gas by a countercurrent flow of acidic water in the absorber, heating the hydrogen cyanide-containing acidic water in the rectifier to drive off acidic gas other than hydrogen cyanide contained therein, passing the thus heated acidified water to a hydrogen cyanide still system and removing said hydrogen cyanide from said acidified water by heating the water in the hydrogen cyanide still, and wherein in said process solid material forms in at least one of said systems on surfaces which are not thoroughly wetted by flow of liquid, the improvement which comprises sweeping said surfaces with a flow of steam thereby preventing the formation of said hard deposits of solid material.

5. The improvement of claim 4 applied only to said absorber and rectifier system.

6. The improvement of claim 4 applied only to said hydrogen cyanide still system.

References Cited in the file of this patent
UNITED STATES PATENTS

| | | |
|---|---|---|
| 2,088,003 | Sperr | July 27, 1937 |
| 2,379,076 | Gollmar | June 26, 1945 |
| 2,419,225 | Mitchell | Apr. 22, 1945 |